(12) United States Patent
Berry et al.

(10) Patent No.: US 9,376,611 B2
(45) Date of Patent: *Jun. 28, 2016

(54) ACID-IN-OIL EMULSION COMPOSITIONS AND METHODS FOR TREATING HYDROCARBON-BEARING FORMATIONS

(75) Inventors: Sandra L. Berry, Tomball, TX (US); Joel L. Boles, Spring, TX (US); Kimberly Izundu, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/610,253

(22) Filed: Sep. 11, 2012

(65) Prior Publication Data

US 2014/0073540 A1 Mar. 13, 2014

(51) Int. Cl.
  *C09K 8/72* (2006.01)
  *C09K 8/60* (2006.01)
  *C09K 8/74* (2006.01)
  *C09K 8/82* (2006.01)

(52) U.S. Cl.
  CPC ............... *C09K 8/725* (2013.01); *C09K 8/602* (2013.01); *C09K 8/74* (2013.01); *C09K 8/82* (2013.01)

(58) Field of Classification Search
  CPC ............ C09K 8/74; C09K 8/82; C09K 8/602; C09K 8/275
  USPC ....................................... 507/221; 516/9, 905
  See application file for complete search history.

(56) References Cited

U.S. PATENT DOCUMENTS

| | | | |
|---|---|---|---|
| 3,938,594 A | 2/1976 | Rhudy et al. | |
| 4,371,447 A | 2/1983 | Webb et al. | |
| 4,708,753 A | 11/1987 | Forsberg | |
| 4,788,001 A | 11/1988 | Narula | |
| 4,844,756 A | 7/1989 | Forsberg | |
| 4,919,179 A | 4/1990 | Chattopadhyay | |
| 5,230,730 A | 7/1993 | Speckmann et al. | |
| 5,355,958 A | 10/1994 | Pauls et al. | |
| 5,427,699 A | 6/1995 | Pauls et al. | |
| 5,739,190 A | 4/1998 | Hartmann et al. | |
| 6,586,479 B2 | 7/2003 | Miller et al. | |
| 6,767,868 B2 | 7/2004 | Dawson et al. | |
| 6,844,296 B2 | 1/2005 | Dawson et al. | |
| 7,481,273 B2 | 1/2009 | Javora et al. | |
| 8,039,422 B1 | 10/2011 | Al-Zahrani | |
| 2005/0090611 A1 | 4/2005 | Huffer et al. | |
| 2007/0119529 A1 | 5/2007 | Hobson et al. | |
| 2008/0099207 A1 | 5/2008 | Venditto et al. | |
| 2008/0179062 A1* | 7/2008 | Watkins et al. | ............ 166/308.2 |
| 2008/0289828 A1 | 11/2008 | Hutchins et al. | |
| 2009/0145607 A1 | 6/2009 | Li | |
| 2011/0303414 A1 | 12/2011 | Seth et al. | |

FOREIGN PATENT DOCUMENTS

| | | |
|---|---|---|
| EP | 0280341 A1 | 8/1988 |
| EP | 0360394 A3 | 3/1990 |
| EP | 0623630 B1 | 11/1994 |
| KR | 200203542 Y1 | 11/2000 |
| KR | 20020035421 A | 5/2002 |
| WO | 03029309 A | 4/2003 |

OTHER PUBLICATIONS

International Search Report for International Application No. PCT/US2013/054344; International filing date Aug. 9, 2013. Issued Nov. 25, 2013 (5 pgs).
Written Opinion for International Application No. PCT/US2013/054344; International filing date Aug. 9, 2013. Issued Nov. 25, 2013 (8 pgs).
Office Action dated Dec. 18, 2014, 29 pages, U.S. Appl. No. 13/537,800.
Office Action dated Dec. 18, 2014, 25 pages, U.S. Appl. No. 13/718,864.
Office Action dated Dec. 18, 2014, 30 pages, U.S. Appl. No. 13/718,844.
IPRP dated Jan. 8, 2015, 7 pages, PCT/US2012/046460.
IPRP dated Jan. 8, 2015, 9 pages, PCT/US2013/047449.
IPRP dated Jan. 8, 2015, 9 pages, PCT/US2013/047530.

* cited by examiner

*Primary Examiner* — Frances Tischler
(74) *Attorney, Agent, or Firm* — Cantor Colburn LLP

(57) ABSTRACT

Disclosed herein is an acid-in-oil emulsion composition comprising an emulsifying agent; a dispersion agent; a base oil; and an acid, wherein the acid-in-oil emulsion composition is substantially devoid of priority pollutants. Disclosed herein too is a method for treating a hydrocarbon-bearing formation comprising blending an emulsifying agent, a base oil and an acid to produce an acid-in-oil emulsion, the acid-in-oil emulsion being substantially devoid of priority pollutants; and discharging the acid-in-oil emulsion into a downhole hydrocarbon-bearing well formation, where the acid-in-oil emulsion is operative to stimulate hydrocarbon production.

21 Claims, 4 Drawing Sheets

ACID-IN-OIL EMULSION COMPOSITIONS AND METHODS FOR TREATING HYDROCARBON-BEARING FORMATIONS

BACKGROUND

Acid treatments are used to stimulate the production of hydrocarbons from hydrocarbon-bearing formations such as limestone and dolomite by increasing the permeability thereof. An aqueous acid solution is pumped downhole through a borehole and into the hydrocarbon-bearing formation. The acid rapidly diffuses, reacts with and penetrates the hydrocarbon-bearing formation, increasing the permeability of the hydrocarbon-bearing formation and stimulating hydrocarbon production.

Due to the rapid diffusion of the acid, most of the acid will be spent near the borehole where the acid is introduced downhole, without penetrating deeply and/or uniformly into the hydrocarbon-bearing formation. The resulting increase in hydrocarbon production is limited by the areas of the hydrocarbon-bearing formation that are not reached by the unspent acid.

Acid-in-oil emulsions, which have an external oil phase and an internal acid phase, are used to delay the acid reaction rate of the acid treatment. The external oil phase provides a barrier to acid diffusion and allows for the acid to be delivered to greater depths and/or more uniformly within the hydrocarbon-bearing formation before the acid reacts with the materials of the hydrocarbon-bearing formation. The delayed reaction of the acid treatment results in improved stimulation of the production of hydrocarbons from hydrocarbon-bearing formations.

Commercially available acid-in-oil emulsions utilize an oil phase such as diesel, crude oil, kerosene or naptha, which are considered priority pollutants. In addition, commercially available acid-in-oil emulsions utilize emulsifiers or other components which also contain priority pollutants. Priority pollutants are a specific set of chemical pollutants classified by the U.S. Environmental Protection Agency (EPA) to regulate their use in treating hydrocarbon-bearing formations. A complete list of priority pollutants identified and regulated by the EPA is provided at http://water.epa.gov/scitech/methods/cwa/pollutants.cfm and can also be found in Appendix A to 40 CFR Part 423.

It is therefore desirable to provide an alternative to commercially available acid-in-oil emulsions which solves one or more of the aforementioned problems associated with these commercially available acid-in-oil emulsion compositions.

SUMMARY OF THE DISCLOSURE

Disclosed herein is an acid-in-oil emulsion composition comprising an emulsifying agent, a dispersion agent, a base oil, and an acid, wherein the acid-in-oil emulsion composition is substantially devoid of priority pollutants.

Disclosed herein too is a method for treating a hydrocarbon-bearing formation comprising blending an emulsifying agent, a base oil and an acid to produce an acid-in-oil emulsion, the acid-in-oil emulsion being substantially devoid of priority pollutants; and discharging the acid-in-oil emulsion into a hydrocarbon-bearing formation, where the acid-in-oil emulsion is operative to stimulate hydrocarbon production.

BRIEF DESCRIPTION OF THE DRAWINGS

For a detailed understanding of the present disclosure, reference should be made to the following detailed description, taken in conjunction with the accompanying drawings in which like elements have generally been designated with like numerals and wherein.

DESCRIPTION OF THE EMBODIMENTS

Figure 1:
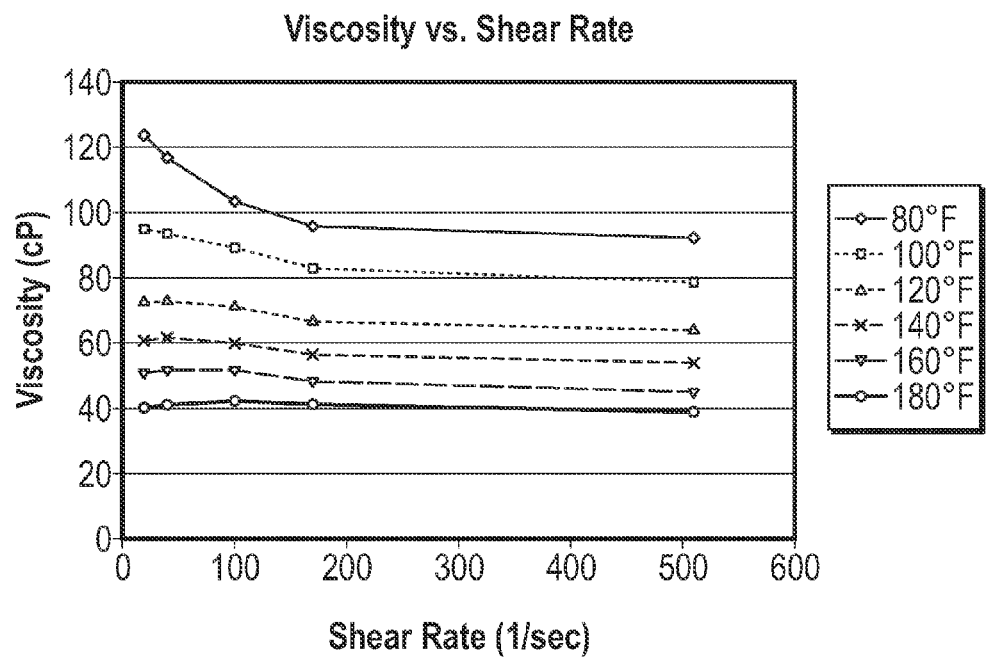
FIG. 1 is a graph depicting the viscosity vs. shear rate at 80° F. to 180° F. of an embodiment of the acid-in-oil emulsion composition.

Disclosed herein is an acid-in-oil emulsion composition that comprises an emulsifying agent; a dispersion agent; a base oil; and an acid. In an exemplary embodiment, the emulsifying agent and/or the dispersion agent facilitates the formation of a stable, dual-phase, acid-in oil emulsion having an external oil phase and an internal acid phase, thereby reducing the acid reaction rate and delaying the diffusion of the acid into a formation when the acid-in-oil emulsion is introduced into the hydrocarbon-bearing formation.

In one embodiment, the emulsifying agent is devoid or substantially devoid of priority pollutants. In one embodiment, the base oil(s) used as the oil phase in the acid-in-oil emulsion composition is devoid or substantially devoid of priority pollutants. In an exemplary embodiment, the acid-in-oil emulsion composition is devoid or substantially devoid of priority pollutants. As used herein, the term "substantially devoid of priority pollutants" refers to a composition containing less than about 5 weight percent (wt %), specifically less than about 1.0 wt %, more specifically about 0.1 wt %, and even more specifically less than about 0.01 wt % of priority pollutants, based on the total weight of the acid-in-oil emulsion composition.

Priority pollutants are a specific set of over 120 chemical pollutants regulated by the EPA in hydrocarbon-bearing formation treatment applications. The EPA has also published analytical test methods to determine the presence of these priority pollutants. Examples of such priority pollutants include, but are not limited, to: polycyclic aromatic hydrocarbons (PAH); benzene, toluene, ethylbenzene, xylenes (BTEX); and heavy metals. As used herein, the term "priority pollutants" refers to any chemical pollutant identified by the EPA as a priority pollutant or which is listed on the EPA list of priority pollutants as provided at http://water.epa.gov/scitech/methods/cwa/pollutants.cfm or in Appendix A to 40 CFR Part 423.

The emulsifying agent is operative to form a stable acid-in-oil emulsion. In one embodiment, the emulsifying agent is a polymeric alkanolamide. The emulsifying agent comprises a compound derived from an alkoxylated amino group of the general formula (1):

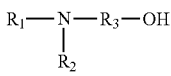

$$R_1\!-\!N\!-\!R_3\!-\!OH \quad (1)$$
$$\,\,\,\,\,\,\,\,\,\,|\,\,\,\,\,\,\,\,\,\,\,\,\,\,\,$$
$$\,\,\,\,\,\,\,\,\,\,R_2\,\,\,\,\,\,\,\,\,\,\,\,\,\,\,$$

wherein $R_1$ is an organic oligomer or a polymer; N is a nitrogen atom; $R_2$ is a hydrogen atom or a straight or branched $C_2$ to $C_{30}$ alkyl group and $R_3$ is a C=O group or a $C_2$ to $C_{30}$ alkyl group. In one embodiment, $R_2$ is a hydrogen atom and $R_3$ is an ethyl group.

The organic oligomer or polymer may be a block copolymer, a random copolymer, a star block copolymer, an alternating block copolymer, a dendrimer, or the like, or a combination comprising at least one of the foregoing organic oligomers or polymers. In one embodiment, the organic oligomer or polymer is selected from the group consisting of polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polyisoprenes, polybutadienes, polyisobutylenes, or the like, or a combination comprising at least one of the foregoing oligomers or polymers.

Oligomers generally have number average molecular weights of less than or equal to 10,000 grams per mole, while polymers generally have number average molecular weights of greater than 10,000 grams per mole. In one embodiment, with reference to the formula (1), $R_1$ has the structure of formula (2)

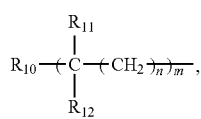

$$R_{10}\!-\!(C(R_{11})(R_{12})\!-\!(CH_2)_n)_m, \quad (2)$$

where n is 0 to 3, specifically 1 to 2; m is 1 to 5000, specifically 2 to 2,500; where $R_{10}$, $R_{11}$ and $R_{12}$ are independently hydrogen or a C1-4 alkyl group, specifically a methyl group.

In one embodiment, $R_1$ has the structure of Formula (3)

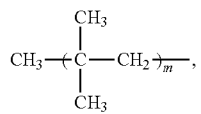

$$CH_3\!-\!(C(CH_3)(CH_3)\!-\!CH_2)_m, \quad (3)$$

where m is 1 to 5000. The structure 3 of Formula (3) is polybutylene. In an exemplary embodiment, the emulsifying agent is polyisobutylene ethanolamide. An exemplary emulsifying agent is HYPERMER 2422 commercially available from Croda.

In another embodiment, the emulsifying agent comprises an organic oligomer or polymer that has succinic acid groups covalently bonded to it and an alkylamine ethoxylated surfactant. A list of the polymers is provided above. In an exemplary embodiment, the polymer that has succinic acid groups covalently bonded to it polyisobutylene. In another exemplary embodiment, the emulsifying agent is a polyisobutylene succinic acid (PIBSA) derived surfactant and an alkylamine ethoxylated surfactant. The alkylamine ethoxylated surfactant may be derived from a mono- or a di-amine and has the general Formula (4) or (5)

$$R\!-\!N(E_aH)\!-\!(CH_2)_x\!-\!N(E_bH)(E_cH) \quad (4)\,\text{or}$$

$$R\!-\!N(E_aH)(E_bH) \quad (5).$$

wherein R is a C8 to C30, specifically a C10 to C24, specifically a C12 to C22 and more specifically a C14 to C20 straight or branched alkyl group; N is a nitrogen atom; E is an ethoxylate group; where x=1, 2, or 3; and a, b, and c is any integer between 0 and 20 such that: a+b+c=any value between 1 and 20, and more specifically between 1 and 14.

Examples of suitable alkylamine ethoxylated surfactants include but are not limited to tallow amine penta ethoxylate, tallow amine tetra ethoxylate, tallow amine hexa ethoxylate, tallow amine hepta ethoxylate, oleyl amine deca ethoxylate, oleyl amine undeca ethoxylate, oleyl amine nona ethoxylate, oleyl amine dodeca ethoxylate, tris(2-hydroxyethyl)-N-tallowalkyl-1,3-diaminopropane, oleyl amine penta ethoxylate, oleyl amine diethoxylate, stearyl alcohol penta ethoxylate and stearyl amine diethoxylate, or the like, or a combination comprising at least one of the foregoing alkylamine ethoxylated surfactants. In an exemplary embodiment the alkylamine ethoxylated surfactant is tallow amine penta ethoxylate, oleyl amine deca ethoxylate, tris(2-hydroxyethyl)-N-tallowalkyl-1,3-diaminopropane. The alkylamine ethoxylated surfactant can be used alone or in combination.

The ethoxylated amine surfactant may be present in the acid-in-oil emulsion composition in an amount of 0.01 to about 10 wt %, specifically about 0.02 to about 5 wt %, and more specifically about 0.03 to about 1.5 wt %, based on the total weight of the acid-in-oil emulsion composition.

The PIBSA derived surfactant is selected from at least one of or a combination of: (1) a PIBSA itself; (2) a PIB succinic acid. This material can be prepared by reacting a PIBSA with water, (3) a PIB succinic acid-amine salt. This material can be prepared by reacting the PIB succinic acid as described in (2) with either an alkyl amine (primary, secondary, or tertiary), or an ethanolamine and/or ethoxylated amine (Formula (4) and (5)) described above. This salt can be a fully neutralized or partially neutralized salt. (4) a PIB succinic aminoalkylester or ester-acid or amine salt thereof. This material can be prepared by reacting the PIBSA or PIB succinic acid as described in (1) and (2) or an ester thereof with a hydroxylamine or an alkanol amine like ethanolamine and/or ethoxylated amine (Formula (4) and (5)) described above, wherein the salt can be a fully neutralized or partially neutralized salt; (5) a succinimide or succinamide or amide-acid salt thereof derived by reacting PIBSA with an amine or poly amine; (6) a succinic ester derived by reacting PIBSA with a polyol.

The PIB based surfactant includes both non-ionic, ionic materials or combinations thereof. The non-ionic materials include PIB succinic acid and PIB succinamides. The ionic materials include PIB succinic acid salts. These are prepared by reaction of the succinic acid with diethylethanolamine. Another embodiment of the ionic material is an amidic acid salt.

The polyisobutylene chain of the PIBSA-derived surfactant has a number average molecular weight of about 200 to about 5000, specifically about 1800 to about 2300, and more specifically about 300 to about 3000 grams/mole.

The PIBSA from which the PIBSA-derived surfactant is prepared is characterized by about 1.3 to about 2.5, specifically about 1.7 to about 2.1, succinic groups per equivalent weight of the polyisobutylene substituent.

The PIBSA-derived emulsifier may be present in the acid-in-oil emulsion composition in an amount of 0.01 to about 10 wt %, specifically about 0.02 to about 5 wt %, and more specifically about 0.03 to about 1.5 wt %, based on the total weight of the acid-in-oil emulsion composition.

An exemplary commercially available emulsifying agent that comprises a polysiobutylene succinic acid (PIBSA) derived surfactant and an alkylamine ethoxylated surfactant is Kemelix 7475X commercially available from Croda.

The hydrophilic-lipophilic balance (HLB) determines the compatibility of the emulsifying agent with a particular base oil. Commercial base oil providers provide the corresponding HLB value of available base oils. In an embodiment, the emulsifying agent is soluble in oil and has a hydrophilic-lipophilic balance (HLB) of less than or equal to about 10, specifically less than or equal to about 8, specifically less than or equal to about 6, specifically less than or equal to about 4.0. The HLB can be determined using calculations or testing. In one embodiment, the emulsifying agent is present in the acid-in-oil emulsion composition in an amount of about 20 gallons per thousand gallons (gpt) to about 40 gpt, specifically about 25 gpt to about 35 gpt, specifically about 28 gpt to about 32 gpt, based on the total volume of the acid-in-oil emulsion composition. In an exemplary embodiment, the emulsifying agent is present in the acid-in-oil emulsion composition in an amount of about 30 gpt by volume based on the total volume of the acid-in-oil emulsion composition.

The dispersion agent facilitates the dispersion of the emulsifying agent in the base oil and enhances the compatibility of the emulsifying agent and the base oil. More specifically, the dispersion agent facilitates the stable dual phase emulsion at temperatures above 180° F. In one embodiment, the dispersion agent is a fatty alcohol surfactant. Surfactants are surface-active agents which function as detergents, wetting agents and emulsifying agents. In another embodiment, the dispersion agent is an alkoxylated fatty alcohol surfactant. In yet another embodiment, the dispersion agent is an ethoxylated fatty alcohol surfactant.

In one embodiment, the dispersion agent is derived from ethylene oxide and one or more fatty alcohols and has the general Formula (6):

$$R-(OCH_2CH_2)_n-OH \quad (6)$$

where R is a straight or branched chained C2 to C30 alkyl group, specifically between C6 and C20, more specifically between C8 and C16 and even more specifically between C10 and C14; and n is an integer from 1 and 20, specifically between 2 and 10, more specifically between 3 and 5.

In one embodiment, the fatty alcohol is a natural fatty alcohol. As used herein, the term "natural fatty alcohol" refers to naturally-occurring fatty acids which are derived from a living being such as an animal, a plant, a microorganism, or the like.

In another embodiment, the fatty alcohol is a primary alcohol having from 8 to 22 carbon atoms. In yet another embodiment, the fatty alcohol is selected from the group consisting of lauryl alcohol, cetyl alcohol, cetearyl alcohol, stearyl alcohol, olelyl alcohol and a combination comprising at least one of the foregoing fatty alcohols.

In one embodiment, the dispersion agent has an alkyl chain length of C12 to C15 and about 4 to about 10 moles of ethylene oxide. In an exemplary embodiment, the fatty alcohol is lauryl (C12) alcohol. In another embodiment, the dispersion agent is a non-ionic surfactant. In yet another embodiment, the dispersion agent has a HLB of less than or equal to about 10.

In an exemplary embodiment, the dispersion agent is represented by general formula (7):

$$(C_{12}H_{25}(OCH_2CH_2)_4OH)_n \quad (7)$$

wherein n is an integer from 1 to 30.

In one embodiment, the dispersion agent is present in the acid-in-oil emulsion composition in an amount of about 1 gpt to about 10 gpt by volume, specifically about 2 gpt to about 8 gpt by volume, and more specifically about 2 gpt to about 4 gpt by volume, based on the total volume of the acid-in-oil emulsion composition. In an exemplary embodiment, the dispersion agent is present in the acid-in-oil emulsion composition in an amount of about 3 gpt by volume based on the total volume of the acid-in-oil emulsion composition.

The dispersion agent is optionally included in the acid-in-oil emulsion composition in low temperature acid treatment applications in which the temperature is less than or equal to about 180° F. In high temperature applications where the temperature exceeds 180° F., the dispersion agent is used in the acid-in-oil emulsion composition to enhance the solubility of the emulsifying agent in the base oil.

In one embodiment, the acid-in-oil emulsion composition further comprises a corrosion inhibitor. The corrosion inhibitor serves to reduce or prevent the corrosion of metal such as borehole and other metal-containing equipment used during the acid treatment process. In an embodiment, the corrosion inhibitor comprises at least one component selected from nitrogenous compounds, such as amines, acetylenic alcohols, mutual solvents and/or alcohols, surfactants, heavy oil derivatives and inorganic and/or organic metal salts. In an exemplary embodiment, the corrosion inhibitor comprises quarternary salts, alcohols, formamide, ethoxylated nonylphenol, or a blend of one or more or all of the foregoing.

In one embodiment, the corrosion inhibitor is present in the acid-in-oil emulsion composition in an amount of about 1 gpt to about 10 gpt, specifically about 1 gpt to about 6 gpt, and more specifically about 1 to about 4 gpt by volume based on the total volume of the acid-in-oil emulsion composition. In an exemplary embodiment, the corrosion inhibitor is present in the acid-in-oil emulsion composition in an amount of about 2 gpt by volume based on the total volume of the acid-in-oil emulsion composition.

The acid used in the acid-in-oil emulsion composition is an aqueous mineral (or inorganic) acid, an organic acid, or a combination thereof. Examples of suitable mineral acids include sulfamic acid, hydrochloric acid, hydrofluoric acid, nitric acid, phosphoric acid, sulfuric acid or combinations thereof. Salts of the foregoing mineral acids may be used as well. In an exemplary embodiment, the acid used in the acid-in-oil emulsion composition is hydrochloric acid.

Examples of suitable organic acids include formic acid, acetic acid, glycolic acid, citric acid, or combinations thereof. Mixtures of organic acid-mineral acids may be used as well. An exemplary mixture is a mixture of hydrofluoric acid and organic acids. Salts of the foregoing organic acids may also be used.

In one embodiment, the acid is present in the acid-in-oil emulsion composition in an amount of about 55% to about 85%, specifically about 60% to about 80%, and more specifically about 65% to about 75% by volume based on the total volume of the acid-in-oil emulsion composition. In an exemplary embodiment, the acid is present in the acid-in-oil emulsion composition in an amount of about 70% by volume based on the total volume of the acid-in-oil emulsion composition.

The base oil forms the external phase of the acid-in-oil emulsion composition. The base oil is a combustible liquid which is essentially insoluble with acid, resulting in the formation of an internal acid phase and an external oil phase which together form the acid-in-oil emulsion.

In one embodiment, the base oil is devoid or substantially devoid of priority pollutants. Examples of base oils which contain priority pollutants include diesel, crude oil, kerosene or naptha base oils. In one embodiment, the base oil is a bio-based oil or fuel. In another embodiment, the base oil is a synthetic linear paraffin. In another embodiment, the base oil is a linear paraffin comprising a carbon chain length between C11 and C14, specifically a carbon chain length between C11 and C13. In another embodiment, the base oil further comprises alcohol and/or one or more additional carbon chain lengths.

In one embodiment, the base oil comprises a C11-C16 olefin-paraffin blend having a paraffin content of greater than or equal to about 70% m/m, specifically greater than or equal to about 75% m/m, specifically greater than or equal to about 80% m/m, and more specifically greater than or equal to about 85% m/m, when measured according to standardized test UK3766. In one embodiment, the base oil comprises a C11-C16 olefin-paraffin blend having an olefin content of greater than or equal to about 10% m/m, specifically greater than or equal to about 15% m/m, specifically greater than or equal to about 20% m/m and more specifically greater than or equal to about 30% m/m, when measured according to standardized test UK3766.

In an exemplary embodiment, the base oil comprises a C11-C16 olefin-paraffin blend having a paraffin content of greater than or equal to about 80% m/m and an olefin content of greater than or equal to about 10% m/m.

In one embodiment, the base oil has an aniline point of greater than or equal to about 70° C., specifically greater than or equal to about 75° C., and more specifically greater than or equal to about 80° C., when measured according to ASTM D-611.

In an exemplary embodiment, the base oil has a kinematic viscosity at 20° C. of about 1.9 cSt, a kinematic viscosity at 40° C. of about 1.3 cSt as measured by ASTM D-445 and/or a pour point of about −24° C. as measured by ASTM D-97.

In one embodiment, less than 1 mg/Kg of aromatics (BETX) are present in the base oil, specifically less than about 0.8 mg/Kg, less than about 0.5 mg/Kg and more specifically less than about 0.1 mg/Kg aromatics (BETX) are present in the base oil. In still yet another embodiment, no aromatics are present in the base oil.

In an embodiment, the base oil has a PAH content of less than about 5.0 mg/Kg, specifically less than about 0.08 mg/Kg, specifically less than about 0.05 mg/Kg, more specifically less than about 0.01 mg/Kg. The PAH content is measured according to the Environmental Protection Agency (EPA) testing method EP 1654A.

The base oil is used in the acid-in-oil emulsion in an amount of about 10% to about 95%, specifically about 10% to about 50%, and more specifically about 25% to about 35% by volume based on the total volume of the acid-in-oil emulsion composition. In an exemplary embodiment, the base oil is used in the acid-in-oil emulsion in an amount of about 30% by volume based on the total volume of the acid-in-oil emulsion composition.

In an embodiment, the acid-in-oil emulsion composition further comprises additional additives, other emulsifiers and surfactants, and corrosion inhibitor intensifiers such as terpenes. Other additives may also be present in the acid-in-oil emulsion composition.

The acid-in-oil emulsion composition is prepared by mixing the emulsifying agent, the dispersion agent, the base oil, the acid and the corrosion inhibitor and other additives. In one embodiment, the acid-in-oil emulsion composition is prepared by mixing the dispersion agent, the acid, the corrosion inhibitor and other additives into the base oil and emulsifiers with lots of shear. In one embodiment, the acid-in-oil emulsion composition is mixed off-site from the acid treatment site. In another embodiment, the acid-in-oil emulsion is mixed at the acid treatment site prior to entering the hydrocarbon-bearing formation. In another embodiment, the acid-in-oil emulsion is mixed at the acid treatment site when the respective constituents are introduced into the hydrocarbon-bearing formation.

Disclosed herein too is a method for treating a hydrocarbon-bearing formation comprising blending an emulsifying agent, a base oil and an acid to produce an acid-in-oil emulsion, the acid-in-oil emulsion being substantially devoid of priority pollutants; and discharging the acid-in-oil emulsion into a hydrocarbon-bearing formation, where the acid-in-oil emulsion is operative to stimulate hydrocarbon production.

The acid-in-oil emulsion composition is used in acid treatments to stimulate the production of hydrocarbons from a hydrocarbon-bearing formation which has been penetrated by a borehole. The acid-in-oil emulsion is pumped into the formation via the borehole. The delay in the acid reaction rate increases the distance reached by the acid from the borehole and enables the acid to be delivered to great depths and/or uniformly within the hydrocarbon-bearing formation. The acid reacts with the materials in the formation, thereby increasing the permeability of the hydrocarbon-bearing formation, increasing the stimulation of hydrocarbon-production.

The acid-in-oil emulsion has a number of advantages over commercially available emulsion systems that are presently used in acid treatments of hydrocarbon-bearing formations. In addition to utilizing priority pollutants, commercially available acid-in-oil emulsions are also limited by other significant disadvantages, including but not limited to, the relatively high viscosity of commercially available acid-in-oil emulsions. The relatively high viscosity of commercially available acid-in-oil emulsions leads to challenges in pumping the acid-in-oil emulsion at a high enough rate to effectively deliver the acid-in-oil emulsion through the borehole and into hydrocarbon-bearing formation.

In another embodiment, the acid-in-oil emulsion composition is heat-stable at downhole temperatures between 180° F. to 400° F. The stable acid-in-oil emulsion composition delays the reaction rate of the acid treatment, allowing the acid to be delivered deeply and/or uniformly downhole into a hydrocarbon-bearing formation. Heat stability of the emulsion is measured at varying temperatures with about 1000 psi nitrogen pressure in a high-temperature, high-pressure (HTHP) fluid loss cell to check for emulsion stability by visual observation. A stable acid-in-oil emulsion does not exhibit fluid separation, which occurs in broken fluids where the fluids making up the emulsion become separated.

In one embodiment, the emulsion agent and dispersion agent are added in an amount effective to form a stable acid-in-oil emulsion composition at temperatures of greater than or equal to about 180° F., specifically greater than or equal to about 250° F., and more specifically greater than or equal to about 350° F. In an exemplary embodiment, the emulsion agent and dispersion agent are added in an amount effective to form a stable acid-in-oil emulsion composition at temperatures of greater than or equal to about 400° F. for at least about one hour.

In an embodiment, the acid-in-oil emulsion composition has a relatively low viscosity in comparison to commercially available acid-in-oil emulsions, which permits effective pumping of the acid-in-oil emulsion downhole by reducing the friction pressure of the fluid. In one embodiment, the fluid viscosity as a function of the shear rate of the acid-in-oil emulsion composition is between about 40 centipoise (cP) to about 125 cP at a shear rate of about 20 $sec^{-1}$ to about 511 sec$^{-1}$ and at temperatures between about 80 and about 180° F. In one embodiment, the fluid viscosity as a function of the shear rate of the acid-in-oil emulsion composition is between about 35 cP to about 45 cP at a shear rate of about 20 sec$^{-1}$ to about 511 sec$^{-1}$ at a temperature of about 180° F. In another embodiment, the fluid viscosity as a function of the shear rate of the acid-in-oil emulsion composition is between about 45 cP to about 55 cP at a shear rate of about 20 sec$^{-1}$ to about 511 sec$^{-1}$ and at a temperature of about 160° F. In another embodiment, the fluid viscosity as a function of the shear rate of the acid-in-oil emulsion is between about 55 cPs at sec$^{-1}$ to about 65 cPs at sec$^{-1}$ at a temperature of about 140° F. In another embodiment, the fluid viscosity as a function of the shear rate of the acid-in-oil emulsion composition is between about 65 cP to about 75 cP at a shear rate of about 20 sec$^{-1}$ to about 511 sec$^{-1}$ sec and at a temperature of about 120° F. In another embodiment, the fluid viscosity as a function of the shear rate of the acid-in-oil emulsion composition is between about 75 cP to about 95 cP at a shear rate of about 20 sec$^{-1}$ to about 511 sec$^{-1}$ and at a temperature of about 100° F. In another embodiment, the fluid viscosity as a function of the shear rate of the acid-in-oil emulsion composition is between about 90 cP to about 125 cP at a shear rate of about 20 sec$^{-1}$ to about 511 sec$^{-1}$ and at a temperature of about 80° F.

In one embodiment, the acid-in-oil emulsion composition exhibits a lower fluid viscosity as a function of shear rate than a commercially available, or comparative, acid-in-oil emulsion which is not devoid or substantially devoid of priority pollutants. The lower viscosity of the acid-in-oil emulsion composition allows for easier pumping of the emulsion through the equipment used in the acid treatment. The acid-in-oil emulsion composition exhibits a reduction in fluid viscosity as a function of shear rate of about 40% to about 80% relative to a comparative acid-in-oil emulsion at 80° F., specifically In another embodiment, the acid-in-oil emulsion composition exhibits a reduction in fluid viscosity as a function of shear rate of about 30% to about 70% relative to the comparative acid-in-oil emulsion at 180° F. The comparative acid in oil emulsion comprises red diesel base oil, which contains priority pollutants, and hydrochloric acid in about the same amounts as the base oil and acid that are used in the disclosed acid-in-oil emulsion composition.

The acid reaction rate or the rate of acid retardation, of the acid-in-oil emulsion composition is similar to that of commercially available, or comparative, acid-in-oil emulsions used in acid treatments. In one embodiment, the acid rate of retardation of the acid-in-oil emulsion composition is within an average range of deviation of about 10% from the acid rate of retardation of a comparative acid-in-oil emulsion, as defined above.

The invention is further described by the following non-limiting examples.

EXAMPLES

Example 1

This example was conducted to demonstrate the heat stability of the acid-in-oil emulsion composition at varying temperatures. In this example, the emulsifying agent used in Sample 1 was a PIBSA alkanolamine. The emulsifying agent used in Sample 2 was a PIB ethanolamide. The base oil used in Sample 1 and Sample 2 was Bio-Base® 300 base oil, a mixture of blended linear paraffin (93%) and olefin available commercially from Shrieve Chemicals Co. The dispersion agent used in both Sample 1 and Sample 2 is an ethoxylated natural fatty alcohol based lauryl alcohol. The acid used in Sample 1 and Sample 2 was 15% hydrochloric acid. Each of Sample 1 and Sample 2 also included a corrosion inhibitors commercially available form from Baker Hughes Company. Various types of corrosion inhibitors can be utilized in acid-in-oil emulsion system. In each of Sample 1 and Sample 2, the acid-in-oil emulsion composition was formulated by mixing 30% base oil, 30 gpt emulsifying agent, 3 gpt dispersion agent and 70% 15% acid with 2 gpt corrosion inhibitor.

The compositions were tested at a pressure of 1000 psi nitrogen in a high-temperature, high-pressure (HTHP) fluid loss cell with different temperatures and incubation periods. The acid-in-oil emulsion compositions were checked for an (oil external) emulsion stability after subjecting them to temperatures of 250° F. for 2.5 hours, 300° F. for 2.5 hours, 350° F. for 1.5 hours and 400° F. for 1 hour, respectively. The test results showed that Samples 1 and 2 are heat-stable emulsions, exhibiting no fluid separation with the following temperatures and time incubations, at 250° F. for 2.5 hours, 300° F. for 2.5 hours, 350° F. for 1.5 hours and 400° F. for 1 hour.

Example 2

This example was conducted to demonstrate the low viscosity of the acid-in-oil emulsion composition when compared to a commercially available acid-in-oil emulsion. In this example, the acid-in-oil emulsion compositions disclosed herein were compared with a commercially available acid-in-oil emulsion which contains priority pollutants. Sample 1 and Sample 2 were prepared according to Example 1. Each of Sample 1 and Sample 2 are devoid or substantially devoid of priority pollutants. Sample 3 was formulated as a comparative sample by mixing 30% red diesel base oil, 20 gpt E-31® emulsifier, 70% acid (15% HCl) and 2 gpt CI-25® corrosion inhibitor. Both the E-31® emulsifier and the red diesel base oil contain priority pollutants in amounts which exceed the limits established by the EPA.

The fluid viscosity of each of the samples was measured at different shear rates of 20 1/sec, 40 1/sec, 100 1/sec, 170 1/sec, 511 1/sec and at varying temperatures of 80° F., 100° F., 120° F., 140° F., 160° F. and 180° F.

The viscosity vs. shear rate results for Sample 1 are shown in Table 1.

TABLE 1

| Temp. (° F.) | n' | K' | Visc. cP @ 511 sec$^{-1}$ | Visc. cP @ 170 sec$^{-1}$ | Visc. cP @ 100 sec$^{-1}$ | Visc. cP @ 40 sec$^{-1}$ | Visc. cP @ 20 sec$^{-1}$ |
|---|---|---|---|---|---|---|---|
| 80 | 0.8541 | 0.37321 | 91.7 | 95 | 103.3 | 116.9 | 124.1 |
| 100 | 0.8849 | 0.27255 | 78.2 | 82.4 | 88.8 | 93.6 | 94.9 |
| 120 | 0.8893 | 0.20408 | 63.4 | 67 | 71.7 | 73.3 | 72.7 |
| 140 | 0.9008 | 0.17132 | 53.9 | 56.7 | 60.5 | 61.8 | 61.3 |
| 160 | 0.9125 | 0.13633 | 44.9 | 48.1 | 51 | 50.9 | 50.3 |
| 180 | 0.9284 | 0.10546 | 38.7 | 40.9 | 42.4 | 41 | 40.4 |

The viscosity vs. shear rate results for Sample 2 are shown in Table 2.

TABLE 2

| Temp. (° F.) | n' | K' | Visc. cP @ 511 sec$^{-1}$ | Visc. cP @ 170 sec$^{-1}$ | Visc. cP @ 100 sec$^{-1}$ | Visc. cP @ 40 sec$^{-1}$ | Visc. cP @ 20 sec$^{-1}$ |
|---|---|---|---|---|---|---|---|
| 80  | 0.8647 | 0.35722 | 92.2 | 95.5 | 103.2 | 115.2 | 122.8 |
| 100 | 0.8779 | 0.28966 | 80.5 | 83.9 | 89.8  | 97.1  | 101.4 |
| 120 | 0.8935 | 0.22094 | 66.9 | 70   | 73.1  | 77.9  | 81.2  |
| 140 | 0.8951 | 0.17549 | 53   | 55.3 | 60.3  | 62.9  | 61.9  |
| 160 | 0.925  | 0.11829 | 42.1 | 44   | 46.5  | 46.3  | 45.1  |
| 180 | 0.9492 | 0.08301 | 34.4 | 35.2 | 35.6  | 35.1  | 34.4  |

The viscosity vs. shear rate results for comparative Sample 3 are shown in Table 3.

TABLE 3

| Temp. (° F.) | n' | K' | Visc. cP @ 511 sec$^{-1}$ | Visc. cP @ 170 sec$^{-1}$ | Visc. cP @ 100 sec$^{-1}$ | Visc. cP @ 40 sec$^{-1}$ | Visc. cP @ 20 sec$^{-1}$ |
|---|---|---|---|---|---|---|---|
| 80  | 0.4679 | 7.90363 | 248.3 | 299   | 441.2 | 692.9 | 866.1 |
| 100 | 0.4702 | 5.78776 | 182.9 | 219.4 | 339.4 | 504.7 | 641   |
| 120 | 0.4669 | 4.59869 | 141.9 | 170.9 | 255.8 | 411.5 | 504   |
| 140 | 0.5151 | 2.69197 | 107.1 | 126.5 | 181   | 282.3 | 342.9 |
| 160 | 0.5621 | 1.68119 | 86    | 99.5  | 136.7 | 205.3 | 246.4 |
| 180 | 0.5988 | 1.19115 | 73.5  | 82    | 115   | 159   | 193.2 |

Figure 2:
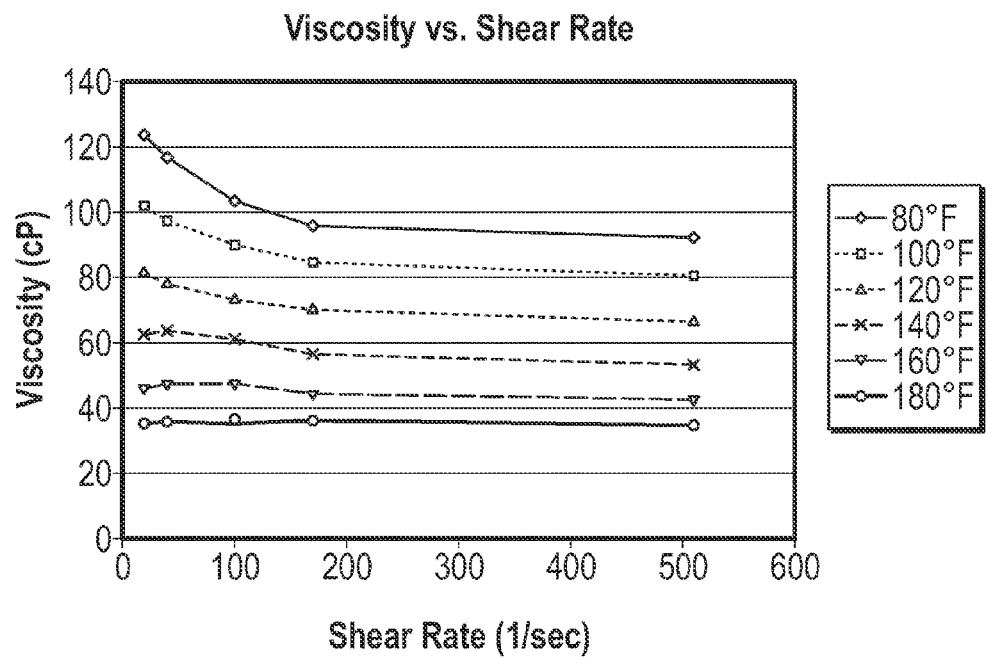
FIG. 2 is a graph depicting the viscosity vs. shear rate at 80° F. to 180° F. of another embodiment of the acid-in-oil emulsion composition.
Figure 3:
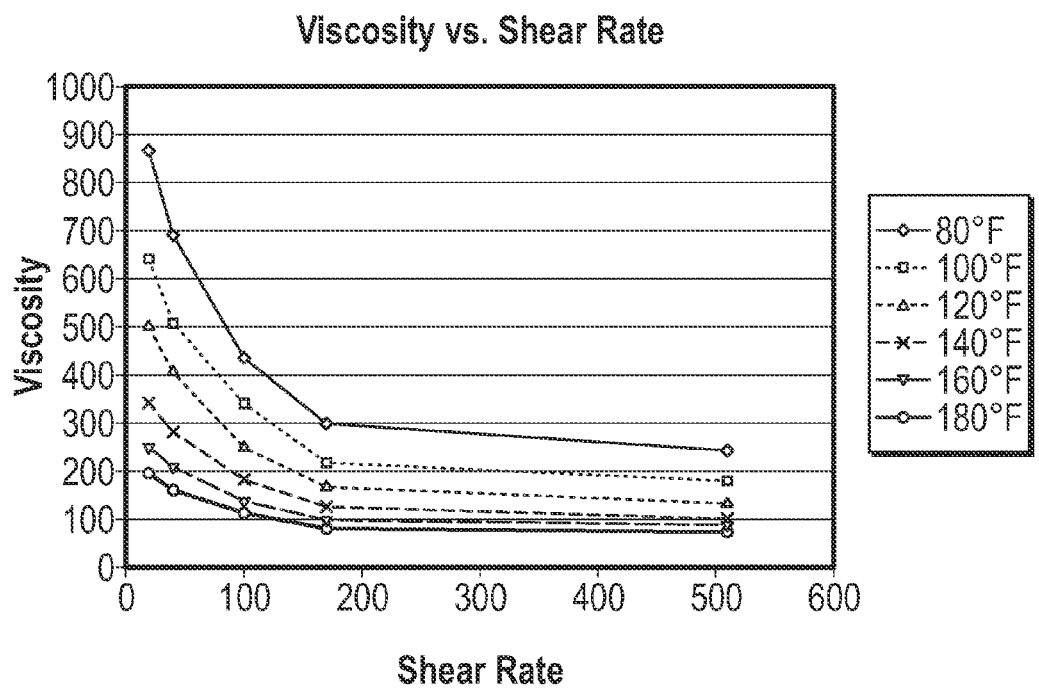
FIG. 3 is a graph depicting the viscosity vs. shear rate at 80° F. to 180° F. of a comparative acid-in-oil emulsion composition.

The results of Tables 1-3 are depicted in graphs showing the viscosity vs. the shear rate for each of the samples at different temperatures, in which FIG. 1 corresponds to Sample 1, FIG. 2 corresponds to Sample 2 and FIG. 3 corresponds to comparative Sample 3. From Tables 1-3 and FIGS. 1-3, it may be seen that the acid-in-oil emulsion compositions disclosed herein have a significantly lower viscosity than the commercially available acid-in-oil emulsion. Table 1 corresponds to FIG. 1, Table 2 to FIG. 2, and Table 3 to FIG. 3.

For example, in comparing Sample 1 with comparative Sample 3 at a temperature of 80° F. and a shear rate of 511 sec$^{-1}$, it may be seen that Sample 1 has a viscosity of 91.7 cP and comparative Sample 3 has a viscosity of 248.3 cP. The acid-in-oil emulsion composition in Sample 1 demonstrated a 63% reduction in viscosity in comparison to the acid-in-oil emulsion of comparative Sample 3.

A similar viscosity reduction is also demonstrated at 180° F. At a shear rate of 511 sec$^{-1}$, it may be seen that Sample 1 has a viscosity of 38.7 cP and comparative Sample 3 has a viscosity of about 73.5 cP at 180° F. The acid-in-oil emulsion composition in Sample 1 demonstrated a 47.3% reduction in viscosity in comparison to the acid-in-oil emulsion of comparative Sample 3.

An even greater viscosity reduction is demonstrated between Sample 2 and comparative Sample 3. The acid-in-oil emulsion composition in Sample 2 demonstrated a 62.9% reduction in viscosity in comparison to the acid-in-oil emulsion of comparative Sample 3 at a temperature of 80° F. and a shear rate of 511 sec$^{-1}$. At a higher temperature of 180° F. and a shear rate of 511 sec$^{-1}$, the acid-in-oil emulsion composition in Sample 2 demonstrated a 53.2% reduction in viscosity in comparison to the acid-in-oil emulsion of comparative Sample 3.

In addition, in comparing FIG. 1 and FIG. 2 with FIG. 3, it may be seen that the acid-in-oil emulsion compositions of Sample 1 and Sample 2 demonstrate an initial viscosity at a shear rate of 20 sec$^{-1}$ which is significantly lower than that of Sample 3 at temperatures between 80° F. and 180° F. Thus, the acid-in-oil emulsion compositions described herein demonstrate a much lower initial and overall viscosity at varying shear rates and temperatures than the commercially available acid-in-oil emulsion.

Example 3

This example was conducted to demonstrate the rate of acid retardation of the acid-in-oil emulsion compositions described herein. Each of Sample 1, Sample 2 and comparative Sample 3 were tested to determine their reaction rates with calcium carbonate. The acid reaction rates of each sample were measured separately in a closed system. A 10 or 20 millimeters of the sample was placed inside a polypropylene jar. Next 1.7 grams of calcium carbonate was then quickly added on top of the sample and the polypropylene jar was closed and connected to a 0-45 psi pressure gauge. The pressure gauge measured the generated $CO_2$ gas pressure over time at 72° F. until a maximum pressure was reached.

Figure 4:
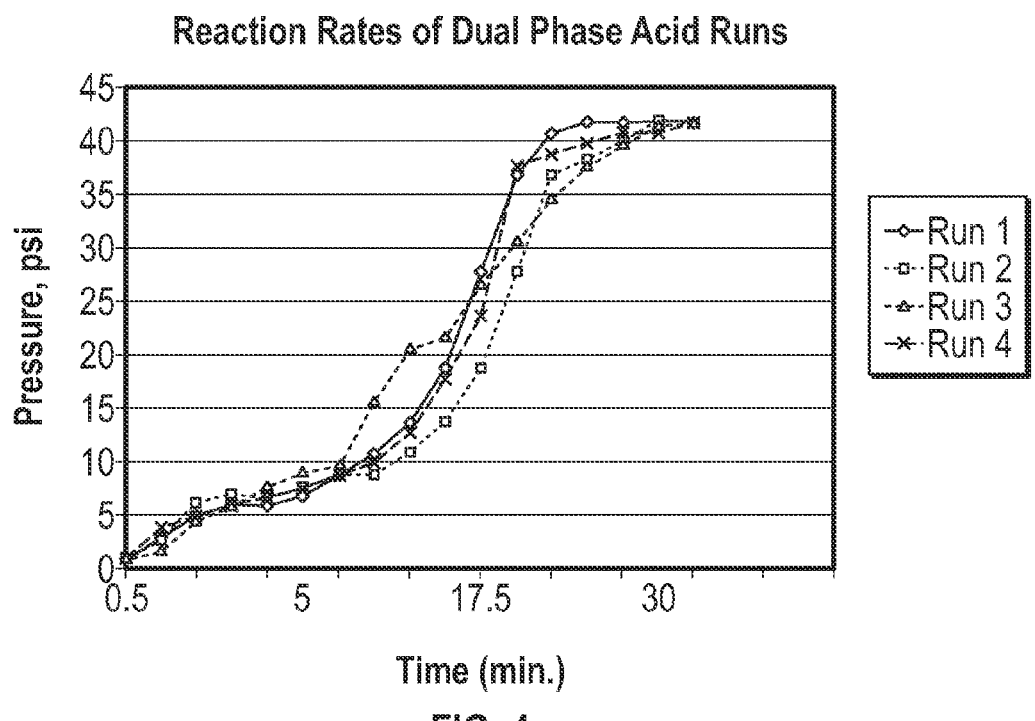
FIG. 4 is a graph depicting the acid reaction rates of a comparative acid-in-oil emulsion composition.

The results of the acid reaction rate tests for comparative Sample 3 are summarized in FIG. 4, which is a graph depicting the pressure of the closed system over time. 20 ml of comparative Sample 3 was used in Run 1 and 10 ml of Sample 1 was used in each of Runs 2, 3 and 4. As can be seen from FIG. 4, the commercially available acid-in-oil emulsion of comparative Sample 3 has an average maximum pressure of about 42 psi after 30 minutes.

Figure 5:
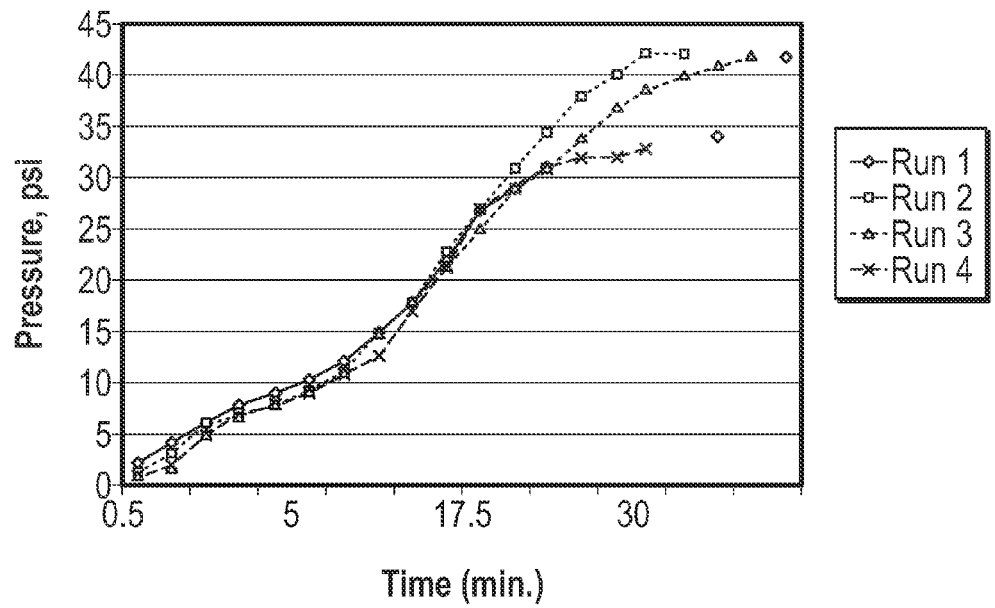
FIG. 5 is a graph depicting the acid reaction rates of one embodiment of the acid-in-oil emulsion composition.

The results of the acid reaction rate tests for Sample 1 are summarized in FIG. 5, which is a graph depicting the pressure in the closed system over time. 20 ml of Sample 1 was used in each of Runs 1, 2, 3 and 4. As can be seen from FIG. 5, Sample 1 has an average maximum pressure of about 42 psi after 40 minutes.

Figure 6:
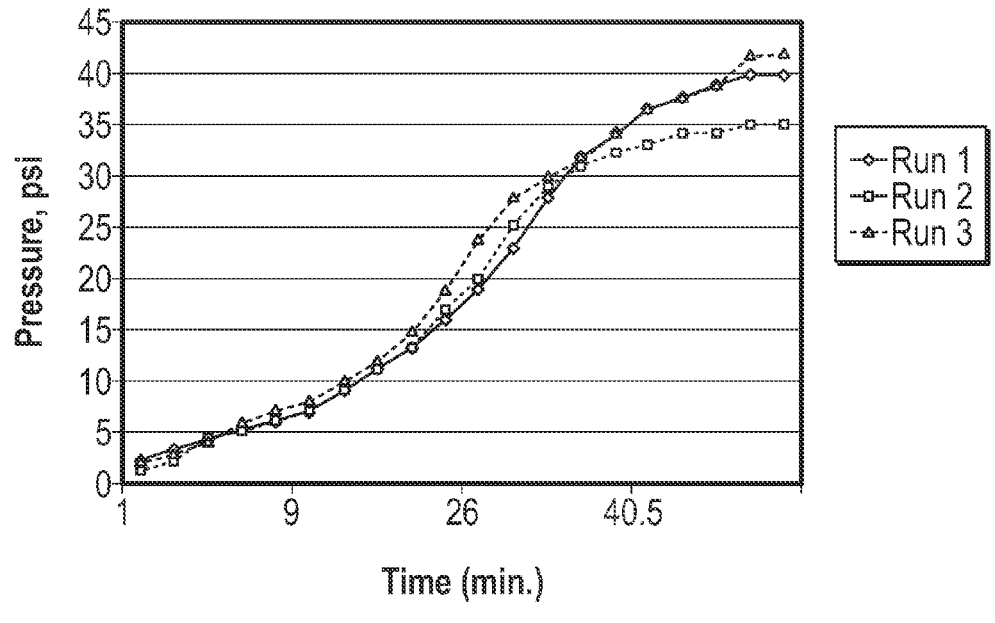
FIG. 6 is a graph depicting the acid reaction rates of another embodiment of the acid-in-oil emulsion composition.

The results of the acid reaction rate tests for Sample 2 are summarized in FIG. 6, which is a graph depicting the pressure in the closed system over time. 10 ml of Sample 1 was used in each of Runs 1, 2 and 3. As can be seen from FIG. 6, Sample 2 has an average maximum pressure of about 42 psi after 40 minutes.

Figure 7:
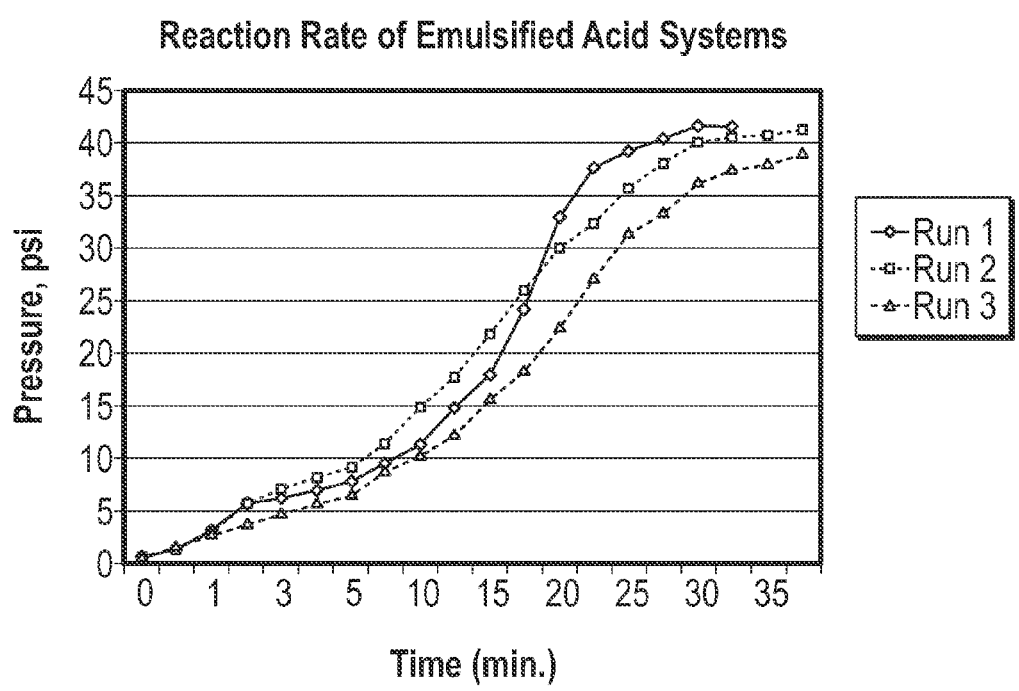
FIG. 7 is a graph depicting the average acid reaction rates of embodiments of the acid-in-oil emulsion composition and a comparative acid-in-oil emulsion composition.

A comparison of the average pressure over time for all of the runs of each of Sample 1, Sample 2 and comparative Sample 3 is shown in FIG. 7. As shown in FIG. 7, the acid-in-oil emulsion compositions of Sample 1, denoted by -■-, and Sample 2, denoted by -▲-, demonstrated similar acid reaction rates with the calcium carbonate material as the commercially available acid-in-oil emulsion of comparative Sample 3, denoted by -♦-. Thus, the acid-in-oil emulsion compositions described herein delay the reaction rate of the acid inside the acid-in-oil emulsion compositions at least to about the same extent as commercially available acid-in-oil emulsions.

From the results in Tables 1-3 and FIGS. 1-7, it may be seen that the acid-in-oil emulsion compositions disclosed herein form a heat-stable, dual phase, low viscosity emulsion which delays the reaction rate of the acid in the emulsion. The low viscosity of the acid-in-oil emulsion compositions described herein relative to commercially available acid-in-oil emulsions results in less friction pressure during the acid treatment process. The acid-in-oil emulsion compositions disclosed herein therefore provide an effective alternative to acid-in-oil emulsions which contain priority pollutants, demonstrate heat stability, exhibit reduced viscosity resulting in less friction pressure during the pumping process. The acid-in-oil emulsions are used in acid treatments such as acidizing treatments or acid fracturing to stimulate the production of hydrocarbon bearing formations.

This invention may be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, the term "acid-in-oil emulsion" refers to a mixture of two or more normally immiscible acid and oil liquids which results in a two-phase colloidal system wherein an acid forms an internal phase within an oil external phase.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The transition term "comprising" is inclusive of the transition terms "consisting of" and "consisting essentially of".

All numerical ranges included herein are interchangeable and are inclusive of end points and all numerical values that lie between the endpoints.

As used herein a "borehole" or "borehole" may be any type of well, including, but not limited to, a producing well, a non-producing well, an experimental well, an exploratory well, a well for storage or sequestration, and the like. Boreholes may be vertical, horizontal, some angle between vertical and horizontal, diverted or non-diverted, and combinations thereof, for example a vertical borehole with a non-vertical component.

The term and/or is used herein to mean both "and" as well as "or". For example, "A and/or B" is construed to mean A, B or A and B.

As used herein, the term "treatment" or "treating" refers to any hydrocarbon-bearing formation operation that uses a fluid in conjunction with a desired function or purpose. The term "treatment" or "treating" does not imply any particular action by the fluid or any particular constituent thereof.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An acid-in-oil emulsion composition comprising, based on the total volume of the acid-in-oil emulsion composition:
   about 20 gallons per thousand gallons to about 40 gallons per thousand gallons of an emulsifying agent consisting essentially of a polyisobutylene ethanolamide;
   about 2 gallons per thousand gallons to about 4 gallons per thousand gallons of a dispersion agent; the dispersion agent being represented by general formula (6): R—(OCH$_2$CH$_2$)$_n$.OH (6) wherein R is a straight or branches chained C2 to C30 alkyl group and n is an integer from 1 and 20;
   about 10% to about 50% by volume of a base oil; and
   about 55% to about 85% by volume of an acid, wherein the acid-in-oil emulsion composition is substantially devoid of benzene, toluene, ethylbenzene and xylene, and
   the acid-in-oil emulsion composition exhibits a fluid viscosity as a function of a shear rate of the acid in the acid-in-oil emulsion composition is between about 40 cP and 125 cP at a shear rate of about 20 sec$^{-1}$ to about 511 sec$^{-1}$ and a temperature between about 80° F. and 180° F.

2. An acid-in-oil emulsion composition comprising, based on the total volume of the acid-in-oil emulsion composition:
   about 20 gallons per thousand gallons to about 40 gallons per thousand gallons of an emulsifying agent, where the emulsifying agent comprises an organic oligomer or polymer that has succinic acid groups covalently bonded to it and an alkylamine ethoxylated surfactant;
   about 2 gallons per thousand gallons to about 4 gallons per thousand gallons of a dispersion agent; the dispersion agent being represented by general formula (6): R—(OCH$_2$CH$_2$)$_n$.OH (6) wherein R is a straight or branches chained C2 to C30 alkyl group and n is an integer from 1 and 20;
   about 10% to about 50% by volume of a base oil;
   about 55% to about 85% by volume of an acid; and
   about 1 gallon per thousand gallons to about 4 gallons per thousand gallons by volume of a corrosion inhibitor;
   wherein the acid-in-oil emulsion composition is substantially devoid of benzene, toluene, ethylbenzene and xylene; and the acid-in-oil emulsion composition exhibits a fluid viscosity as a function of a shear rate of the acid in the acid-in-oil emulsion composition is between about 40 cP and 125 cP at a shear rate of about 20 sec$^{-1}$ to about 511 sec$^{-1}$ and a temperature between about 80° F. and 180° F.

3. The acid-in-oil emulsion composition of claim 2, where the organic oligomer or polymer is selected from the group consisting of polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polyisoprenes, polybutadienes, polyisobutylenes, or a combination comprising at least one of the foregoing oligomers or polymers.

4. The acid-in-oil emulsion composition of claim 3, where the organic oligomer or polymer that has succinic acid groups covalently bonded to it is a polyisobutylene succinic acid; a polyisobutylene succinic acid reacted with water; a polyisobutylene succinic acid amine salt obtained by reacting the polyisobutylene succinic acid with either an alkyl amine, an ethanolamine or an ethoxylated amine; a polyisobutylene succinic aminoalkylester or ester-acid or amine salt prepared by reacting the polyisobutylene succinic acid or an ester thereof with a hydroxylamine or an alkanol amine; a polyisobutylene succinimide or succinamide or amide-acid salt thereof derived by reacting polyisobutylene succinic acid with an amine or poly amine; or a polyisobutylene succinic ester derived by reacting polyisobutylene with a polyol.

5. The acid-in-oil emulsion composition of claim 3, where the alkylamine ethoxylated surfactant may be derived from a mono- or a di-amine and has the general Formula (4) or (5)

R—N(E$_a$H)—(CH$_2$)$_x$—N(E$_b$H)(E$_c$H)         (4) or

R—N(E$_a$H)(E$_b$H)         (5), wherein R comprises a C8 to C30 straight or branched alkyl group; N represents a nitrogen atom; E is an ethoxylate group; where x=1, 2, or 3; and a, b, c, is any integer between 0 and 20 such that: a+b+c has any value between 1 and 20.

6. The acid-in-oil emulsion composition of claim 1 wherein, in formula (6), R is a straight or branched chained C6 to C20 alkyl group and n is an integer from 2 to 10.

7. The acid-in-oil emulsion composition of claim 1, wherein the dispersion agent is derived from ethylene oxide and lauryl alcohol.

8. The acid-in-oil emulsion composition of claim 1, wherein the base oil comprises a C11-C16 olefin-paraffin blend.

9. The acid-in-oil emulsion of claim 1, wherein the acid is a mineral acid, an organic acid, or a combination comprising at least one of the foregoing acids.

10. The acid-in-oil emulsion of claim 1, wherein the acid is an aqueous mineral acid, hydrochloric acid, hydrofluoric acid, sulfamic acid, an organic acid, an organic acid-mineral acid blend, an organic acid-hydrofluoric acid blend or a combination comprising at least one of the foregoing.

11. The acid-in-oil emulsion composition of claim 1, wherein the acid-in-oil emulsion composition forms a heat-stable emulsion comprising an external oil phase and an internal acid phase at temperatures between about 180° F. and about 400° F.

12. The acid-in-oil emulsion composition of claim 1, wherein the acid-in-oil emulsion composition forms a heat-stable emulsion comprising an external oil phase and an internal acid phase at temperatures greater than or equal to about 350° F.

13. A method for treating a hydrocarbon-bearing formation comprising:
blending an emulsifying agent, a base oil and an acid to produce an acid-in-oil emulsion of claim 1, the acid-in-oil emulsion being substantially devoid of benzene, toluene, ethylbenzene and xylene; and
discharging the acid-in-oil emulsion into a downhole hydrocarbon-bearing well formation, where the acid-in-oil emulsion is operative to stimulate hydrocarbon production.

14. The method of claim 13, wherein the acid-in-oil emulsion comprises an external oil phase and an internal acid phase and is heat-stable at temperatures between about 180° F. and about 400° F.

15. The method of claim 13, wherein the acid-in-oil emulsion composition forms a heat-stable emulsion comprising an external oil phase and an internal acid phase at temperatures greater than or equal to about 350° F.

16. The acid-in-oil emulsion composition of claim 1, further comprising about 1 gallon per thousand gallons to about 4 gallons per thousand gallons by volume based on the total volume of the acid-in-oil emulsion composition of a corrosion inhibitor.

17. The acid-in-oil emulsion composition of claim 1 comprising, based on the total volume of the acid-in-oil emulsion composition,
about 25 gallons per thousand gallons to about 35 gallons per thousand gallons of the emulsifying agent;
about 2 gallons per thousand gallons to about 4 gallons per thousand gallons of the dispersion agent; the dispersion agent being represented by general formula (6), wherein R is a straight or branched chained C6 to C20 alkyl group and n is an integer from 2 to 10;
about 25% to about 35% by volume of the base oil; the base oil comprising a C11-C16 olefin-paraffin blend; and
about 60% to about 80% by volume of the acid.

18. The acid-in-oil emulsion composition of claim 17 comprising, based on the total volume of the acid-in-oil emulsion composition,
about 28 gallons per thousand gallons to about 32 gallons per thousand gallons of the emulsifying agent;
about 2 gallons per thousand gallons to about 4 gallons per thousand gallons of the dispersion agent;
about 25% to about 35% by volume of the base oil; and
about 65% to about 75% by volume of the acid.

19. The acid-in-oil emulsion composition of claim 18, wherein the acid is hydrochloride acid.

20. The acid-in-oil emulsion composition of claim 2 comprising, based on the total volume of the acid-in-oil emulsion composition,
about 28 gallons per thousand gallons to about 32 gallons per thousand gallons of the emulsifying agent;
about 2 gallons per thousand gallons to about 4 gallons per thousand gallons of the dispersion agent;
about 25% to about 35% by volume of the base oil; and
about 65% to about 75% by volume of the acid.

21. The acid-in-oil emulsion composition of claim 20, wherein the acid is hydrochloride acid.

\* \* \* \* \*